Figure 1:
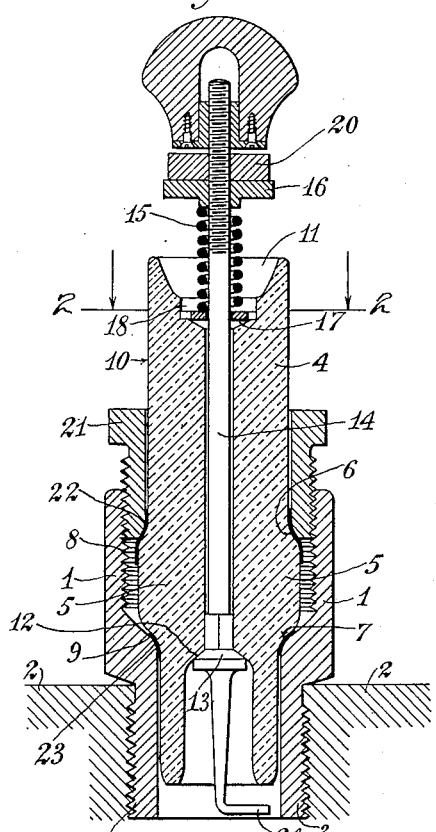

A. V. RYDER.
SPARKING PLUG.
APPLICATION FILED JULY 16, 1920.

1,403,448.

Patented Jan. 10, 1922.

INVENTOR,
A. V. Ryder,
BY
E. G. Siggers.
ATTORNEY.

UNITED STATES PATENT OFFICE.

ARTHUR VERNON RYDER, OF EASTBOURNE, ENGLAND.

SPARKING PLUG.

1,403,448.   Specification of Letters Patent.   Patented Jan. 10, 1922.

Application filed July 16, 1920. Serial No. 396,812.

(GRANTED UNDER THE PROVISIONS OF THE ACT OF MARCH 3, 1921, 41 STAT. L., 1313.)

*To all whom it may concern:*

Be it known that I, ARTHUR VERNON RYDER, a subject of His Majesty the King of England, and resident of Eastbourne, in the county of Sussex, Kingdom of England, have invented certain new and useful Improvements in or Relating to Sparking Plugs, (for which I have filed an application in England, October 20, 1914, Patent No. 21,226,) of which the following is a specification.

This invention relates to sparking plugs of the kind wherein the inner electrode is provided on a rod or stem disposed centrally of the plug, the said rod or stem having a conical valve at its inner end and being depressible against the action of a spring. In one such construction the rod is displaceable longitudinally under the engine suction to permit of the entry of air to the sparking points or electrodes immediately after the explosion of the carburetted mixture. In another construction of the above type the central rod or stem is manually depressible to allow of contact of the inner and outer electrodes so that on rotating the central rod or stem the two electrodes mutually clean each other. The present invention has for its object to provide an improved sparking plug which is simple in construction, efficient in action and which provides a reliable means to facilitate starting of any internal combustion engine to which it is applied, especially when applied to Ford engines. It has heretofore been proposed to provide a sparking plug having a hollow central stem carrying the inner electrode at its lower end and provided with a gasoline cock at its upper end, comprising a funnel through which passes the stem of a valve, the said stem having a hole normally at right angles to the bars of the central stem, which is rotatable into a position such that the hole coincides with the said bore so as to allow of the injection or squirting of gasoline to the sparking points through the hollow central stem.

According to the present invention the inner electrode stem of a sparking plug is provided at its inner end with means to maintain a fluid tight joint between the interior of the engine cylinder and the atmosphere and is adapted to be depressed to allow of the admission of liquid fuel to the sparking points and to the engine cylinder. The insulating member which is preferably of porcelain is provided at its outer end with a cavity or cup-shaped recess in communication through the bore of the said insulating member with the sparking points but normally shut off from the sparking points by a conical valve on the central stem or rod and near the inner end thereof. The rod projects upwardly through the porcelain insulating member of the plug and through the cavity or cup-shaped recess and is provided at its outer end with a fibre or other suitable insulating handle. Surrounding the central electrode-stem above the cavity or cup-shaped recess is a guide-washer of any suitable material and having a notched periphery, the said washer being disposed in a circular recess formed at the bottom of the cup-shaped cavity so as to guide the washer in its movements. Between the guide-washer and the fibre handle is interposed a spring which normally maintains the conical valve against its seat formed in the inner end of the porcelain insulating member.

Figure 2:
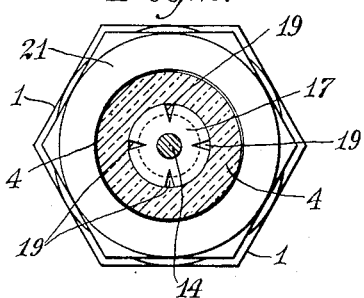

In order that the invention may be clearly understood reference is made to the accompanying drawing which shows in Figure 1 a vertical longitudinal section of a plug made in accordance with the present invention. Figure 2 is a transverse section on the line 2—2 of Fig. 1; I desire it to be understood that I do not limit myself to the precise details of constructions hereinafter described and illustrated.

Referring to the drawing the plug comprises a metallic body or shell 1 adapted to be screwed into the engine cylinder 2 or otherwise suitably fixed in position therein. The metallic body or shell 1 is formed as an outer ring-electrode 3 at its inner end and has a bore adapted to receive the inner end of the insulating member 4 preferably of porcelain having an enlarged portion 5 coned as at 6 and 7. The metallic body 1 is cored interiorly to correspond with the diameter of the enlarged portion of the porcelain insulating member 4 and is screw-threaded internally as at 8 and formed with a coned seat 9 for the correspondingly coned part 7 of the porcelain 4. The diameter of the porcelain is reduced as at 10 above the enlarged portion 5 thereof and the said porcelain is provided with a cavity or cup-shaped recess 11 at its outer end, and with a chamber formed with a conical valve seat 12 at its inner end. Against this seat a conical valve 13 provided on the central electrode stem or rod 14 is normally maintained by the action of a spring 15 interposed between an adjustable washer 16 and a guide-washer 17 loose on the central stem or rod. At the bottom of the cup-shaped recess is a circular recess 18 to receive and guide the washer 17 which is notched as at 19 to allow of the ready flow of liquid fuel to the bore of the porcelain insulating member. The terminal of the magneto-lead may be clamped between the adjustable washer 16 and an adjustable locking nut or washer 20.

The porcelain insulating member is retained in position by a gland 21 adapted to screw into the internally screwed bore at the outer end of the plug, a suitable washer 22 being interposed between the insulating member and the gland 21 and a second washer 23 between the porcelain insulating member and the shell 1 of the plug. 24 is the inner electrode comprising a radially and outwardly directed arm on the central stem or rod which together with the arm can be rotated by the insulated handle into any desired position so that the entire inner surface of the ring electrode and the sparking point can be cleaned or freed from hydro-carbon deposition when the sparking is taking place.

The porcelain insulating member may be made of steatite or other suitable insulating material and the central stem or rod passes freely therethrough.

By the present construction it will be observed that although the plug is normally gas tight the central stem carrying the inner electrode can be depressed when desired so as to allow of priming of the engine by the introduction of gasoline through the bore of the porcelain insulating member to the sparking points and the engine cylinder. The inner electrode can be easily and readily rotated to permit of cleaning the electrodes and further a damaged or useless central electrode can be easily and quickly removed and replaced by a new central electrode at small cost. As the central stem or rod is loose in the porcelain insulating member the latter is not liable to crack on account of the heat developed by the ignition of the combustible fuel in the cylinder. Obviously the construction of the plug is extremely simple as there are only three main parts.

What is claimed is:—

1. In a spark plug, a shell, a porcelain insulating member having a central bore and a valve seat at its lower end, a control stem extending through the said central bore and provided with a valve adapted to seat against the valve seat of the porcelain insulating member, an electrode on said stem, and an insulated handle for the stem whereby the latter may be depressed or rotated for the purpose explained.

2. In a spark plug, a shell, a porcelain insulating member removably clamped in the shell, a central stem slidable and rotatable within the porcelain, a valve on the stem at an intermediate point, a chamber in the porcelain at its inner end, said chamber having a conical valve seat at the top, means for causing said valve to be normally seated on said seat, an electrode at the lower or inner end of said stem, and insulated means on the upper end of the stem whereby the stem may be rotated and moved longitudinally by hand during the sparking of the plug.

3. In a spark plug, a shell, a porcelain insulating member having a longitudinal bore and fitting into the shell, a stem passing through the bore but of less diameter than the bore, a valve on the stem at an intermediate point of its length, an electrode provided at the lower end of the stem, a chamber formed at the inner end of the porcelain and having a conical top which provides a valve seat, said valve when seated closing the bore, a recess provided at the upper end of the porcelain and coaxial with the bore, a guide washer slidable on the stem and received within said recess, openings formed in the washer whereby a liquid poured into said recess may pass the washer and run down through the bore to the electrodes.

4. In a spark plug, a shell, a porcelain insulating member having a longitudinal bore and fitting into the shell, a stem passing through the bore but of less diameter than the bore, a valve on the stem at an intermediate point of its length, an electrode at the lower end of the stem, a chamber provided at the inner end of the porcelain, said chamber providing a valve seat at the lower end of the bore, said valve when seated closing said bore, a recess provided at the upper end of the porcelain and coaxial with the bore, a guide washer slidable on the stem and received within said recess, notches provided in the periphery of the washer whereby a liquid poured into said recess may pass the washer and run through the bore to the electrodes, means mounted upon the outer end of the stem whereby the latter may be rotated about its longitudinal axis, means for effecting an electrical connection between a conductor and the stem, and means mounted between the latter named means and the washer for normally maintaining the valve seated.

In testimony whereof I hereunto sign my name.

ARTHUR VERNON RYDER.